(12) United States Patent
Skrobot et al.

(10) Patent No.: US 12,017,288 B2
(45) Date of Patent: Jun. 25, 2024

(54) REMOTELY CONTROLLED CUTTING TOOL AND METHOD

(71) Applicant: Huskie Tools, LLC, Glendale Heights, IL (US)

(72) Inventors: Nicholas Skrobot, Glendale Heights, IL (US); Dan Voss, Glendale Heights, IL (US)

(73) Assignee: Huskie Tools, LLC, Glendale Heights, IL (US)

(*) Notice: Subject to any disclaimer, the term of this patent is extended or adjusted under 35 U.S.C. 154(b) by 523 days.

(21) Appl. No.: 17/296,111

(22) PCT Filed: Sep. 28, 2020

(86) PCT No.: PCT/US2020/053131
§ 371 (c)(1),
(2) Date: May 21, 2021

(87) PCT Pub. No.: WO2021/062392
PCT Pub. Date: Apr. 1, 2021

(65) Prior Publication Data
US 2021/0394286 A1    Dec. 23, 2021

Related U.S. Application Data

(60) Provisional application No. 62/906,264, filed on Sep. 26, 2019.

(51) Int. Cl.
*B23D 29/00* (2006.01)
*H02G 1/12* (2006.01)

(52) U.S. Cl.
CPC ......... *B23D 29/002* (2013.01); *H02G 1/1214* (2013.01)

(58) Field of Classification Search
None
See application file for complete search history.

(56) References Cited

U.S. PATENT DOCUMENTS

| | | | |
|---|---|---|---|
| 4,283,851 A | 8/1981 | Wolter | |
| 7,160,142 B2 | 1/2007 | Hughes et al. | |
| 10,799,962 B2 | 10/2020 | Barezzani et al. | |
| 2017/0157787 A1 | 6/2017 | Skinner et al. | |
| 2017/0358909 A1 | 12/2017 | Ballard et al. | |
| 2021/0394286 A1* | 12/2021 | Skrobot | H02G 1/1214 |

FOREIGN PATENT DOCUMENTS

CN    114901446 A  *  8/2022
EP    0812044 A1    12/1997
(Continued)

OTHER PUBLICATIONS

English translation of JP 2019-155485, publication date: Sep. 19, 2019.*

(Continued)

*Primary Examiner* — Hwei-Siu C Payer
(74) *Attorney, Agent, or Firm* — Shumaker, Loop & Kendrick, LLP; S. Alexander Long, Jr.

(57) ABSTRACT

A remotely controlled cutting tool for safely cutting electrified cables using a remote control and a method of setting up and operating the remotely controlled cutting tool and remote control.

25 Claims, 6 Drawing Sheets

(56) References Cited

FOREIGN PATENT DOCUMENTS

GB          2600139 A    *   4/2022
JP       2019-155485     *   9/2019

OTHER PUBLICATIONS

English translation of CN 114901446 A, publication date: Aug. 12, 2022.*
Patent Cooperation Treaty; Notification of Transmittal, International Search Report and Written Opinion mailed Jan. 5, 2021, and cited in Application No. PCT/US2020/053131; 11 pages.
"MI8TM FORCELOGICTM 75mm (3") Underground Cable Cutter w/ Wireless Remote (M18HCC75R-OC)"; (Milwaukee Tools Australia)[online](retrieved from the Internet on Nov. 20, 2020) <URL https://www.youtube.com/watch?v=u810H0CA0rs>, Dec. 20, 2017 (Dec. 20, 2017); entire document, especially 0:01, 0:03-0:05, 0:2.

* cited by examiner

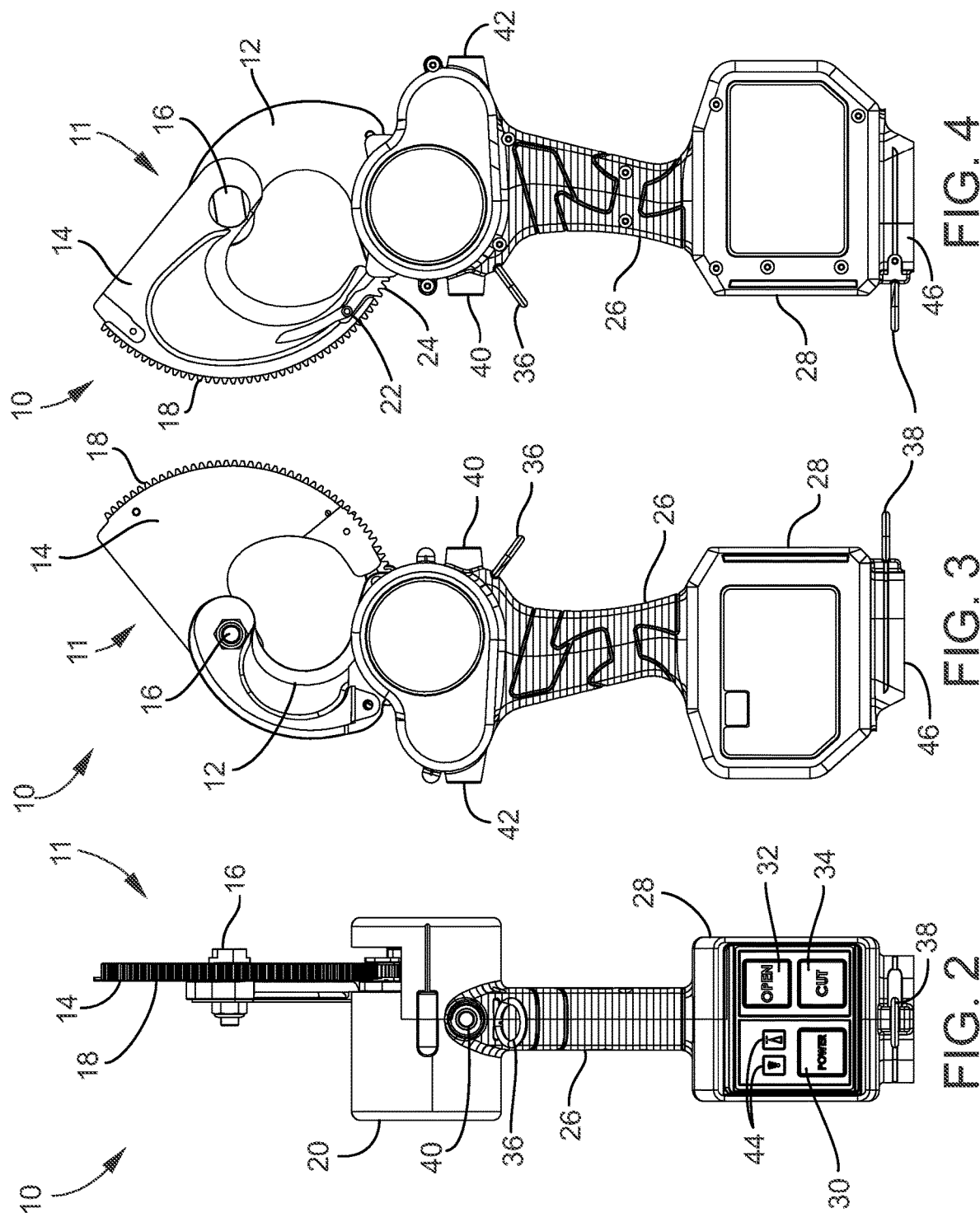

REMOTELY CONTROLLED CUTTING TOOL AND METHOD

CROSS-REFERENCE TO RELATED APPLICATIONS

This application is a United States 371 national stage application tracing priority to and claiming benefit of Patent Cooperation Treaty (PCT) application number PCT/US2020/053131 filed Sep. 28, 2020 and tracing priority to and claiming the benefit of U.S. Provisional Application No. 62/906,264 filed Sep. 26, 2019, titled REMOTELY CONTROLLED CUTTING TOOL AND METHOD, the entirety of both of which are expressly incorporated herein by reference.

TECHNICAL FIELD AND BACKGROUND OF THE INVENTION

The present invention relates to the field of cable cutting in the electrical industry, particularly to tools used by utility linemen and professional electricians to cut electrically conductive cable. The present invention includes a cutting tool that provides safety features to reduce risk of injury to the operator.

Traditional handheld cutting tools are used by linemen and professional electricians to cut cables during installation, upgrading, and routine maintenance. Electrified cables pose a risk of injury to operators as electrical current may pass through a handheld device to the hand of the operator. There is a need for a cable cutting tool capable of being safely controlled from a distance.

BRIEF SUMMARY OF THE INVENTION

It is therefore an object of the present invention to provide a remotely controlled cutting tool capable of cutting cable that does not require physical contact during operation.

It is another object of the present invention to provide a remotely controlled cutting tool which does not have an activation trigger on the cutting tool.

According to an aspect of the invention a remotely controlled cutting tool includes a stationary blade, a moving blade having an arched outer perimeter including a plurality of teeth, a rotatable connection between the stationary plate and the moving blade, a mechanical gear drive for engaging with the plurality of teeth on the moving blade to rotate the moving blade about the rotatable connection, and a remote control adapted to remotely activate the mechanical gear drive.

According to another embodiment of the invention, the tool does not have an activation trigger for the mechanical gear drive and only the remote control is adapted to activate the tool.

According to another embodiment of the invention, a positive latch is connected to the moving blade and adapted to engage with the mechanical gear drive to position the moving blade in a predetermined position.

According to another embodiment of the invention, a sensor is adapted to detect moving blade position.

According to another embodiment of the invention, the tool includes indicators for blade position, power setting, and battery charge.

According to another embodiment of the invention, the tool and the remote control are exclusively paired.

According to another embodiment of the invention, an adjustable grounding stud is positioned on the rotatable connection between the stationary blade and the moving blade.

According to another embodiment of the invention, rigging and accessory attachment means are provided.

According to another embodiment of the invention, controls for the tool and the remote control are backlit.

According to another embodiment of the invention, a method for operating a remotely controlled cutting tool includes the steps of positioning a cable between a stationary blade and a moving blade of a remotely controlled cutting tool, engaging the moving blade with a mechanical gear drive, and cutting the cable by activating the mechanical gear from a distance with a remote control.

According to another embodiment of the invention, the positioning of the tool around the cable prevents damage to adjacent cables.

According to another embodiment of the invention, a grounding stud is connected to the tool for providing grounding to the stationary and moving blades during operation of the tool.

According to another embodiment of the invention, the tool is securely positioned with rigging connected to rigging points on the tool.

According to another embodiment of the invention, the tool does not have an activation trigger and activation can only occur by activation triggers on the remote control.

According to another embodiment of the invention, indicators on the remote control are adapted to provide feedback on the status of the cut.

BRIEF DESCRIPTION OF THE DRAWINGS

Features, aspects and advantages of the present invention are understood when the following detailed description of the invention is read with reference to the accompanying drawings, in which:

FIG. 2 is a front view of the remotely controlled cutting tool in FIG. 1;

FIG. 3 is a right side view of the remotely controlled cutting tool in FIG. 1;

FIG. 4 is a left side view of the remotely controlled cutting tool in FIG. 1;

DETAILED DESCRIPTION OF THE INVENTION

Figure 1:
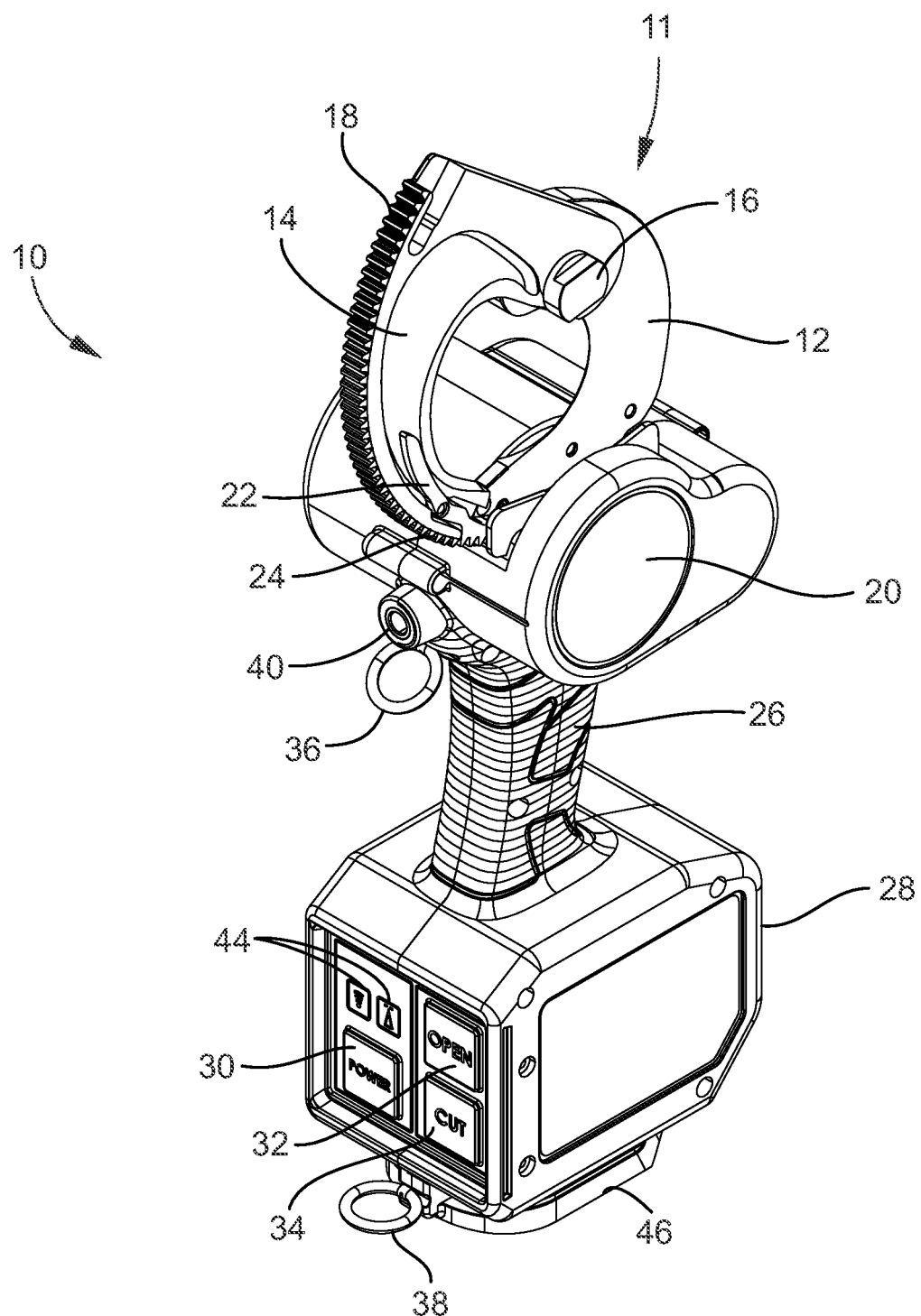
FIG. 1 is a perspective view of a remotely controlled cutting tool.
Figure 5:
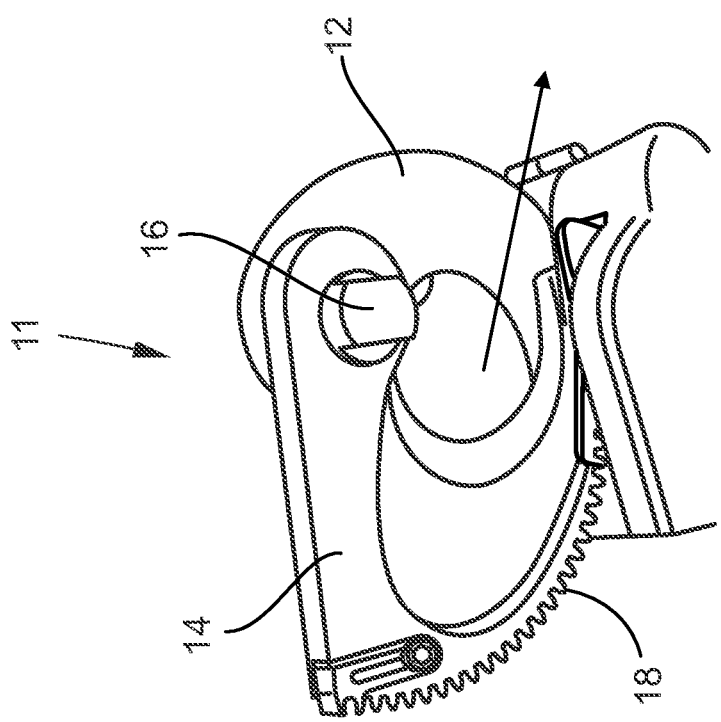
FIG. 5 is a partial perspective view of the remotely controlled cutting tool in FIG. 1.
Figure 6:
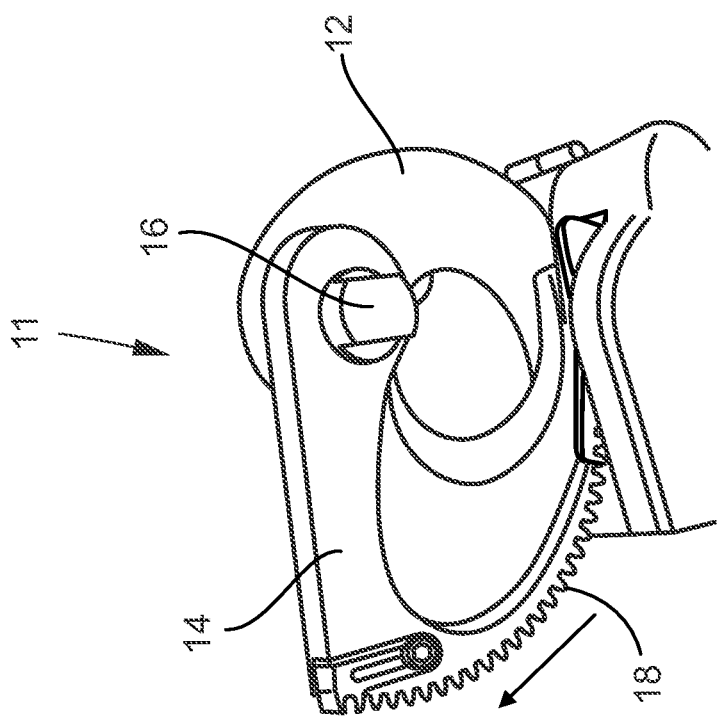
FIG. 6 is a partial perspective view of the remotely controlled cutting tool in FIG. 1.

Referring now to FIGS. 1-6, a remotely controlled cutting tool 10 is shown. The tool 10 has a jaw 11 which includes a stationary blade 12 and a moving blade 14 which pivots around a bolted pivoting connection 16. A plurality of teeth 18 are positioned around a portion of the outer circumference of the moving blade 14. The teeth engage with a gear, or drive mechanism, (not shown) contained within a gear housing 20. Rotation of the gear within the gear housing 20 causes the moving blade 14 to either move closer to or further away from the stationary blade 12 for cutting purposes or opening purposes. The inside circumference, or edges, of the blades 12, 14 are sharpened such that they are able to cut through cable as the moving blade 14 pivots toward the stationary blade 12. This cutting motion can be seen is FIG. 5. The releasing, or opening, motion is likewise shown in FIG. 6.

A positive blade engagement latch 22 is connected to an end of the moving blade 14. The latch 22 has a set of teeth 24 that enable the operator to positively engage with the drive mechanism to hold the moving blade 14 in a desired position to ensure correct setup and positioning. This latch 22 and teeth 24 combination enables an operator to position a cable between the blades 12, 14 and secure the moving blade 14. Cables of various sizes require the moving blade 14 to be positioned relative the stationary blade 12 such that the opening between the sharpened edges are able to accommodate the various cable sizes.

Figure 8:
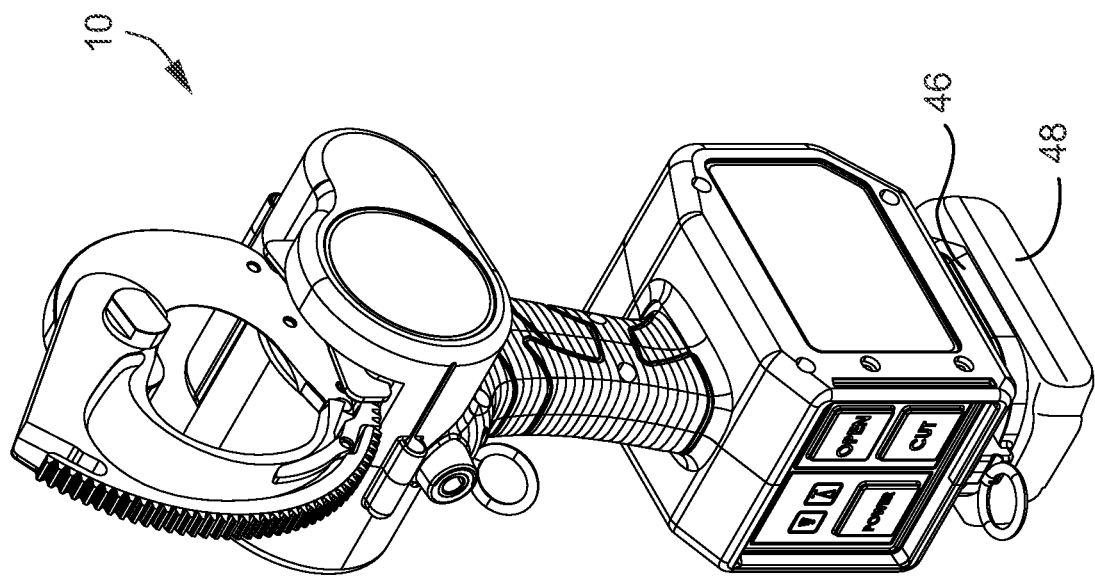
FIG. 8 is a perspective view of the remotely controlled cutting tool in FIG. 1 having a battery installed.
Figure 7:
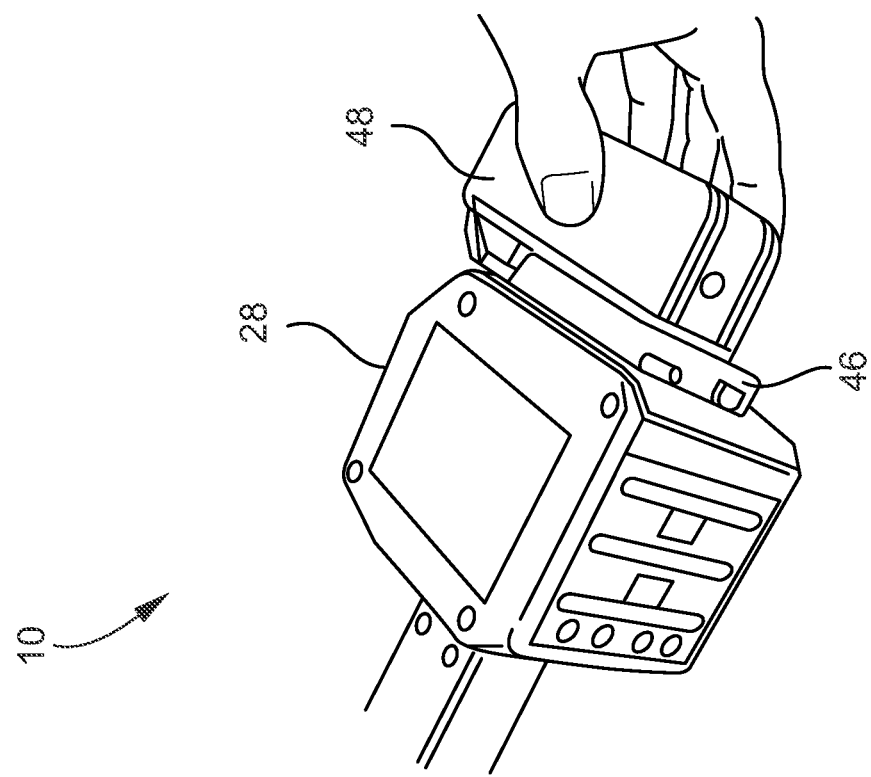
FIG. 7 is a partial perspective view of the remotely controlled cutting tool in FIG. 1.

A handle 26 is positioned between the gear housing 20 and a motor housing 28. As shown in FIGS. 7 and 8, a battery connector 46 is located on the motor housing 28 enabling the operator to attach a battery 48 to the tool 10. One example of a battery 48 is a 18V slide-on battery. The motor housing 28 has a control button 30 for power 30, a control button 32 for setting the gear into a jaw opening rotation 32, and a control button 34 for setting the gear into a jaw closing, or cutting, rotation 34. As a safety feature, the jaw control buttons 32, 34 only put the gear into place for the desired motion and are not capable of activating the tool 10. The tool 10 itself does not have an activation trigger. This safety feature prevents unintended tool 10 activation during setup and removal.

LED indicators 44 on the motor housing 28 provide a simple visual check for the operator prior to leaving the work area. The LED indicators 44 provide good light in low light and high light conditions, such as in underground situations and in direct sunlight situations. Examples of LED indicators 44 include tool 10 power, gear direction (cut or open), successful blade engagement, and successful connection to a remote control 110. A blade engagement sensor (not shown) may monitor the connection between the latch 22 and the gear within the gear housing 20. Upon successful engagement, the LED indicators 44 may show that blade engagement has been successful. Additional indicators may be included such as a successful cut indicator and a jaw 11 fully open indicator.

The gear housing 20 and the motor and battery housing 28 are designed such that minimal space within is wasted while all of the necessary components, such as the mechanicals, electronics, communication module and battery interface are contained within. This design reduces the size and weight of the tool 10. The handle 26 enables the operator to handle the tool 10 one handed while using insulated gloves for tool 10 placement and rigging.

The tool 10 includes two rings, a first ring 36 positioned relatively closer to the jaws 11, and a second ring 38 positioned at the base of the motor and battery housing 28. In addition to the rings 36, 38, a first female thread 40 is positioned near the first ring 36 and a second female thread 42 is positioned on an opposite side of the tool 10 as the first female thread. The female threads 40, 42 are 3/8-16 UNC female threads. Various accessories such as straps, handles, rigging, tripods, eyebolts, hoist rings, T's, handles, and the like may be connected to the rings 36, 38 or to the female threads 40, 42.

Figure 9:
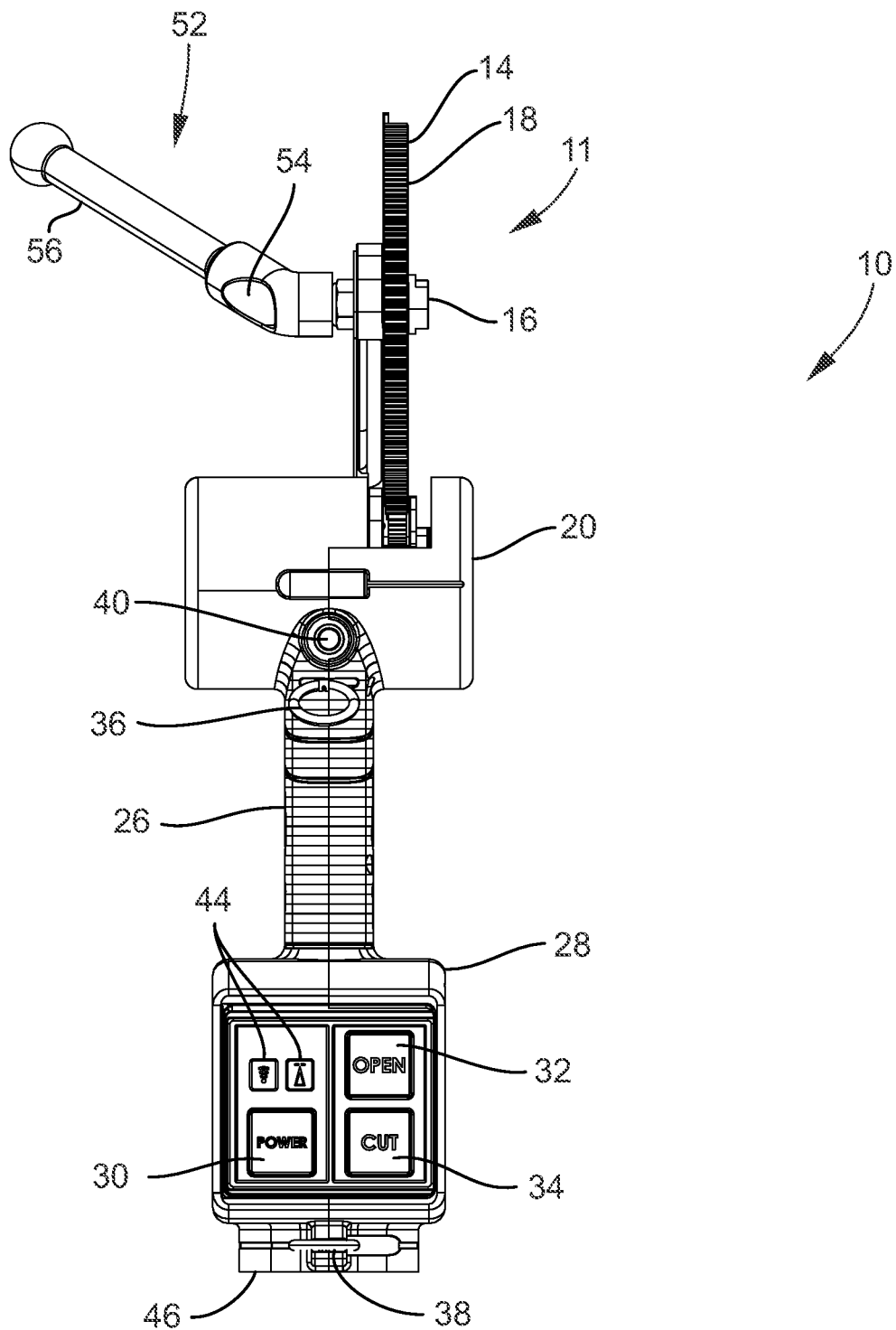
FIG. 9 is a perspective view of the remotely controlled cutting tool in FIG. 1 having a grounding stud installed.

The tool 10 has a grounding stud 52 connected to the pivoting connection 16. The grounding stud 52 allows various types of grounding clamps to be connected to the tool 10 and make electrical connection to the blades 12, 14. As shown in FIG. 9, a ball socket ground stud 52 having a 1" OD ball 54 and a 4" long shank 56 are connected directly to the pivot bolt 16. The ball socket ground stud 52 allows for multiple angles of position.

Figure 11:
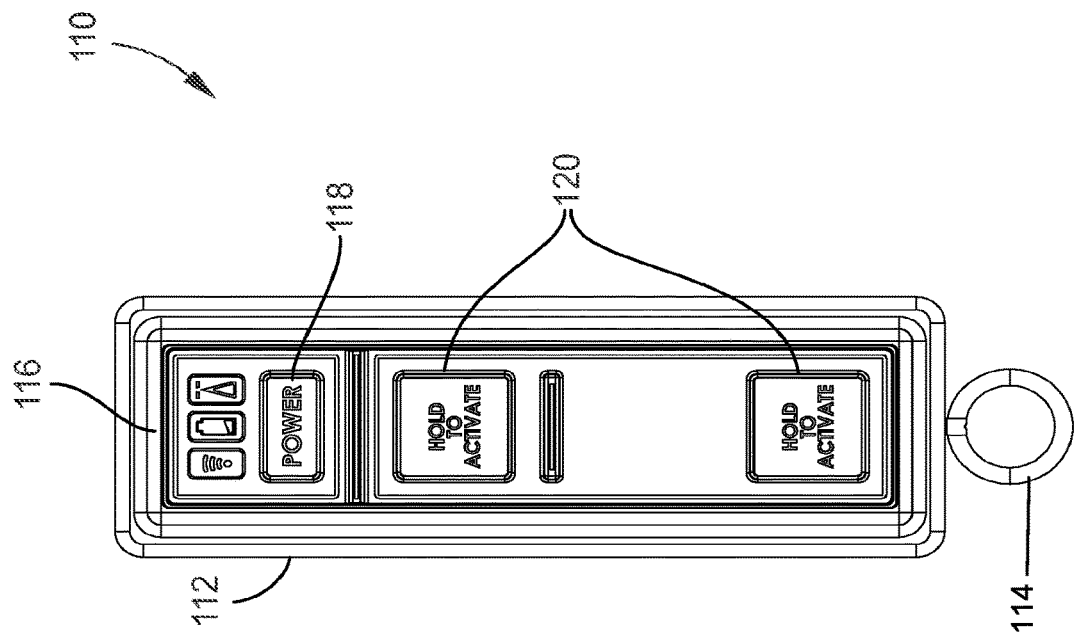
FIG. 11 is a front view of the remote control in FIG. 10.
Figure 10:
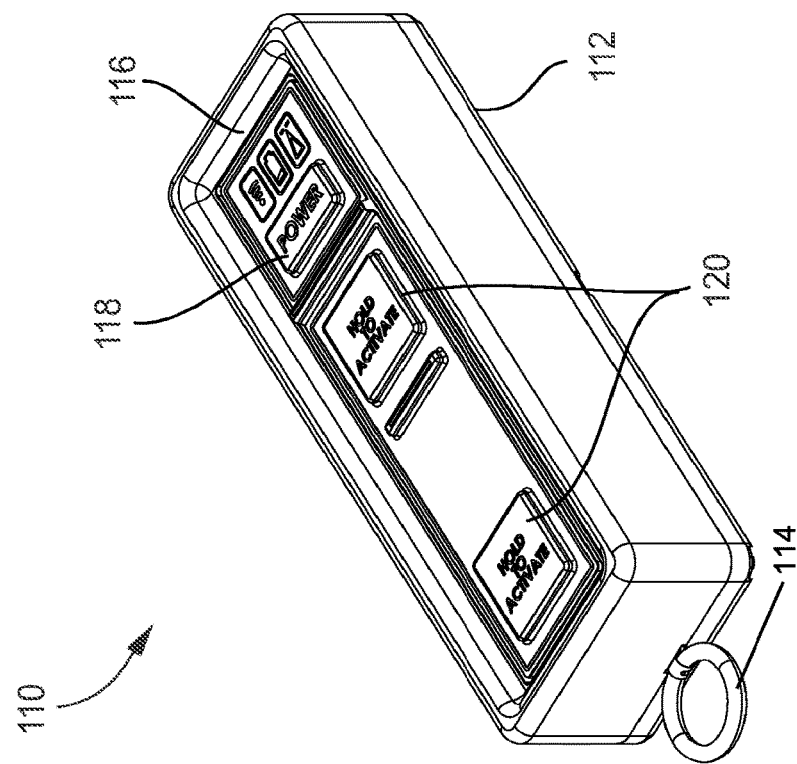
FIG. 10 is a perspective view of a remote control for use with the remotely controlled cutting tool in FIG. 1.

Referring now to FIGS. 10 and 11, a remote control 110 for being paired with a specific tool 10 is shown. The remote control 110 has a housing 112 containing electronics, a battery, and a communication module. The remote control 110 also has a ring 114 positioned on the housing 112. The ring 114 allows for the remote control 110 to include straps, be connected to another device or accessory, be stored connected to the tool 10, and likewise. It is intended that each remote control 110 is adapted to exclusively pair with only one tool 10. For security and safety each tool 10 may only be paired with one remote control 110 at a time. Exclusive pairing increases control and security over tool 10 activation, speed of pairing in the field, and reduces the risk of communication interference and signal interruption. Corresponding serial numbers, or other identifiers, may be included on the tool 10 and the remote control 110 so that the correct tool 10 and remote control 110 can be paired together.

Like the tool 10, the remote control 110 includes several LED indicators 116. These indicators 116 may duplicate the indicators 44 on the tool 10 such as tool 10 power, gear direction (cut or open), successful blade engagement, and successful pairing between the tool 10 and the remote control 110. Additionally other indicators 116 may be included such as remote control 110 power and low battery warning (for the tool 10, remote control 110, or both). Examples of indicators 116, 44 provided may be only on one of the tool 10 or the remote control 110 or on both.

A power on/off button 118 is positioned on the housing 112. The power button 118 primarily turns the power on/off for the remote control 110.

Activation of the tool 10 is only achieved by utilizing the remote control 110 as no activation means exists on the tool 10 itself. Two separate activation buttons 120 are positioned on the remote control 110. These activation buttons 120 are in a spaced-apart relationship. The tool 10 will not activate until both of the activation buttons 120 have been pressed down by the operator. This additional security reduces accidental activation of the tool 10. All or some of the buttons 118, 120 are recessed on the housing 112 to minimize accidental triggering for further safety. The buttons 118, 120 may be switches or other suitable controlling means. An additional safety feature may include automatic stopping on the tool 10 in the event that communication between the tool 10 and the remote control 110 is lost or degraded.

In one embodiment, the remote control 110 may be capable of communicating at a distance of at least 150 feet from the tool 10. Sorting and operating temperatures for both the tool 10 and the remote control 110 may be between −40° F. (−40° C.) to +140° F. (+60° C.).

Operation of the tool 10 by the operator includes several steps, including many steps that are optional. The basic, necessary steps include setting up the tool 10 around the cable to be cut and using the remote control 110 to initiate the cut. Using the tool 10 may include the following steps:

1.) validate the tool 10 and remote serial numbers match;
2.) check tool 10 and remote control 110 battery power levels;
3.) keep the remote control 110 in the possession of the operator with the power turned off during tool 10 setup and rigging;
4.) setup the tool around the cable to be cut;
5.) rig the tool 10 into position, if necessary;
6.) engage the moving blade 14 into desired position around the cable with the latch 22;
7.) turn the tool 10 power on;
8.) select a gear direction (cut or open);
9.) confirm the moving blade 14 is properly engaged with the LED indicator 44;
10.) operator relocate to a designated safe location with the remote control 110;
11.) turn the remote control 110 power on;
12.) verify that the remote control 110 has properly connected to the tool 10 by the indicator 116 on the remote control 110;
13.) verify that the moving blade 14 is engaged by the indicator 116 on the remote control 110;
14.) depress the two activation buttons 120 at the same time and hold in the depressed condition until the blade engaged indicator 116 turns off;
15.) once operation is complete, release the activation buttons 120 and turn the power off for the remote control 110 prior to reentering the work area.

The foregoing has described a remotely controlled cutting tool 10 with remote control 110 and method of use. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A cutting tool system for cutting a cable, the cutting tool system comprising:
    a remote control; and
    a cutting tool, comprising:
        (a) a housing;
        (b) a first blade operatively coupled to the housing;
        (c) a second blade configured to interact with the first blade to cut the cable;
        (d) a pivoting connection between the first blade and the second blade and configured to allow the second blade to pivot about the pivoting connection between an open position for receiving the cable and a closed position, wherein the first blade and the second blade are closed about the received cable;
        (e) an electro-mechanical drive inside the housing, the electro-mechanical drive configured to cause the first blade and the second blade together to cut the cable;
        (f) a grounding stud operatively coupled to the pivoting connection and configured to provide a grounding functionality to the cutting tool, and
        (g) wherein the cutting tool is configured to wirelessly pair with the remote control and wirelessly receive transmissions from the remote control causing the cutting tool to cut the cable.

2. The cutting tool system of claim 1, further comprising:
    (a) a battery connector; and
    (b) a battery configured to connect to the battery connector and power the cutting tool when connected.

3. The cutting tool system of claim 2, wherein the battery is an 18V rechargeable battery.

4. The cutting tool system of claim 1, wherein the pivoting connection is a bolted pivoting connection.

5. The cutting tool system of claim 1, wherein the first blade and the second blade are both concave and coupled together to form an enclosed cutting aperture for cutting the cable.

6. The cutting tool system of claim 1, wherein the cutting tool comprises a plurality of indicators comprising one or more LED indicators configured to indicate at least successful connection to the remote control.

7. The cutting tool system of claim 1, wherein the remote control comprises a plurality of indicators comprising one or more LED indicators configured to indicate at least a successful cut.

8. The cutting tool system of claim 1, further comprising:
    a first ring positioned proximate the first and second blades; and
    a second ring positioned proximate the housing.

9. The cutting tool system of claim 1, further comprising:
    a sensor configured to detect a position of the first blade and/or the second blade; and
    an indicator configured to receive a signal from the sensor and provide an indication of a successful cut.

10. A cutting tool system for cutting a cable, the cutting tool system comprising:
    a remote control; and
    a cutting tool, comprising:
        (a) a housing;
        (b) a first blade operatively coupled to the housing;
        (c) a second blade configured to interact with the first blade to cut the cable;
        (d) a pivoting connection operatively coupled to the second blade and configured to allow the second blade to pivot about the pivoting connection between an open configuration configured for receiving the cable to be cut and a closed configuration whereby the first blade and the second blade together form an enclosed cutting aperture for cutting the cable;
        (e) a drive inside the housing, the drive when activated configured to cause the enclosed cutting aperture to shrink from an uncut position to a fully cut position wherein the enclosed cutting aperture is smaller in the fully cut position than the uncut position and the first blade and the second blade together cut the cable;
        (f) a grounding stud operatively coupled to the pivoting connection configured to provide a grounding functionality to the cutting tool, and
        (g) wherein the cutting tool is configured to wirelessly pair with the remote control and wirelessly receive one or more control signals from the remote control to cause the drive to activate, thereby causing the cable to be cut.

11. A cable cutting system configured to cut a cable, the cable cutting system comprising:
    (a) a wireless remote control; and
    (b) a cutting tool configured to wirelessly pair with the remote control and wirelessly receive transmissions from the remote control causing the cutting tool to cut the cable, the cutting tool comprising:
        (i) a housing;
        (ii) a first blade operatively coupled to the housing;
        (iii) a second blade configured to interact with the first blade to cut the cable;

(iv) a pivoting connection between the first blade and the second blade and configured to allow the second blade to pivot about the pivoting connection between an open position for receiving the cable and a closed position, wherein the first blade and the second blade are closed about the received cable;

(v) a grounding stud operatively coupled to the pivoting connection configured to provide a grounding functionality to the cutting tool, and (vi) an electro-mechanical drive inside the housing, the electro-mechanical drive configured to cause the first blade and the second blade together to cut the cable.

12. A cable cutting system of claim 11, wherein the remote control comprises a ring configured to connect to an accessory.

13. A cable cutting system of claim 11, wherein the remote control comprises a plurality of light emitting diode (LED) indicators configured to indicate at least successful pairing between the cutting tool and the remote control.

14. A cable cutting system of claim 11, wherein the remote control comprises a plurality of input buttons recessed in a housing of the remote control, thereby minimizing accidental triggering of the buttons.

15. A method for operating a wirelessly remotely controlled cutting tool, the method comprising the steps of:
(a) positioning a cable between a first blade and a second blade of the wirelessly remotely controlled cutting tool;
(b) connecting grounding clamps to a grounding stud operably coupled to the first and second blades of the wirelessly remotely controlled cutting tool;
(c) engaging one or both the first and second blades with an electro-mechanical drive; and
(d) cutting the cable by activating the electro-mechanical drive from a distance with a wirelessly connected remote control.

16. The method for operating the wirelessly remotely controlled cutting tool of claim 15, wherein the method further comprises securely positioning the tool with rigging by connecting the rigging to rigging points on the tool.

17. The method for operating the wirelessly remotely controlled cutting tool of claim 15, wherein the activating of the electro-mechanical drive includes activating one or more activation triggers on the remote control.

18. The method for operating the wirelessly remotely controlled cutting tool of claim 15, further comprising providing, via one or more indicators on the remote control, an indication on the status of the cut, where the indication indicates completion of the cut.

19. A cable cutting system, comprising:
(a) a remote control;
(b) a cutting tool configured to be wirelessly paired with the remote control to receive wireless transmissions therefrom, wherein the cutting tool comprises:
(i) a housing;
(ii) an electromechanical drive at least partially housed within the housing, wherein the electromechanical drive is configured to be activated by a wireless transmission from the remote control;
(iii) a first blade operatively coupled to the housing;
(iv) a second blade operatively coupled to the electromechanical drive and configured to engage the first blade in response to activation of the electromechanical device in order to provide a cutting functionality; and
(v) a grounding stud coupled to the cutting tool proximate at least one of the first blade and the second blade, the grounding stud being configured to provide a grounding functionality to the cutting tool.

20. The cable cutting system of claim 19, wherein at least one of the first blade and the second blade is operatively coupled to each other via a pivoting connection and configured to open and close about the pivoting connection thereby forming an aperture between the first blade and the second blade, wherein the pivoting connection enables a cable to be positioned between the first blade and the second blade when the at least one blade is opened and enables the cable to be cut when the at least one blade is closed.

21. The cable cutting system of claim 19, wherein the remote control comprises at least one light emitting diode (LED) indicator configured to indicate successful blade engagement.

22. The cable cutting system of claim 19, wherein the first blade is configured to be stationary during operation.

23. The cable cutting system of claim 19, wherein once the second blade is activated, the second blade is configured to continuously engage toward the first blade until an object positioned between the first blade and the second blade has been cut.

24. A cutting method, comprising:
(a) positioning a cable between a first blade of a cutting tool and a second blade of the cutting tool such that the first blade and the second blade encircle the cable;
(b) providing an input to a remote control wirelessly paired to the cutting tool, the remote control being spatially separated from the cutting tool;
(c) activating, in response to the input, an electromechanical drive of the cutting tool;
(d) engaging, via the electromechanical drive of the cutting tool, the second blade of the cutting tool with the first blade of the cutting tool to cut the cable; and
(e) operatively coupling grounding clamps to a grounding stud of the cutting tool.

25. The method of claim 24, wherein the engaging the second blade of the cutting tool comprises shrinking an aperture formed by the first blade and the second blade from an uncut position to a fully cut position.

* * * * *